United States Patent [19]
David et al.

[11] Patent Number: 5,948,101
[45] Date of Patent: Sep. 7, 1999

[54] METHODS AND SYSTEMS FOR BOOTING A COMPUTER IN A DISTRIBUTED COMPUTING SYSTEM

[75] Inventors: Peter Frost David, Canton; Paul Raymond Jackson, Kingston, both of Mass.

[73] Assignee: The Foxboro Company, Foxboro, Mass.

[21] Appl. No.: 08/758,656

[22] Filed: Dec. 2, 1996

[51] Int. Cl.[6] .................................................. G06F 9/06
[52] U.S. Cl. .............................. 713/2; 709/222; 395/712
[58] Field of Search ............................ 395/651, 652, 395/653, 712, 200.5, 200.51, 200.52; 713/1, 2, 100; 709/220, 221, 222

[56] References Cited

U.S. PATENT DOCUMENTS

| | | | |
|---|---|---|---|
| 4,663,707 | 5/1987 | Dawson | 364/200 |
| 5,142,680 | 8/1992 | Ottman et al. | 395/700 |
| 5,146,568 | 9/1992 | Flaherty et al. | 395/325 |
| 5,280,627 | 1/1994 | Flaherty et al. | 395/700 |
| 5,452,454 | 9/1995 | Basu | 395/700 |
| 5,553,282 | 9/1996 | Parrish et al. | 395/200.52 |
| 5,577,210 | 11/1996 | Abdous et al. | 395/200.52 |
| 5,680,547 | 10/1997 | Chong | 395/200.52 |

*Primary Examiner*—Kevin A. Kriess
*Attorney, Agent, or Firm*—David Barron; Jules Jay Morris; Terrence Martin

[57] ABSTRACT

A field mountable controller boots by transmitting a seed letterbug to a server. The server responds with an initial operating system and program. The program reads configuration information about the controller and transmits it back to the server which responds with a particular letterbug for the controller. The controller then transmits the letterbug to a boot image server which returns a corresponding operating system image to the controller. The controller then boots using the operating system.

29 Claims, 10 Drawing Sheets

PRIOR ART

Fig. 1

PRIOR ART

BOOT PROCESS USING HARDWARE LETTERBUGS

METHODS AND SYSTEMS FOR BOOTING A COMPUTER IN A DISTRIBUTED COMPUTING SYSTEM

TECHNICAL FIELD

The present invention relates, in general, to distributed computer systems. In particular, the present invention relates to methods and systems for loading software images to network attached processors through a software letterbug identification technique.

BACKGROUND OF THE INVENTION

Computing technology began with a computing model consisting of a central processor performing all computational functions within a computer system. This model has changed over the years, and although still very relevant to certain applications, other computing models have been developed.

One current computing model is a distributed processing system. This computing model includes multiple processors that are interconnected by a network. Computing tasks are distributed among the processors as application requirements demand.

The distributed computing model has been applied to the industrial process control environment. Advantageously, this computing model facilitates higher reliability and increased system throughput, yielding improved process control. One example of an industrial process control system adhering to a distributed computing model is the "I/A Series" system from The Foxboro Company of Foxboro, Mass., USA.

Figure 1:
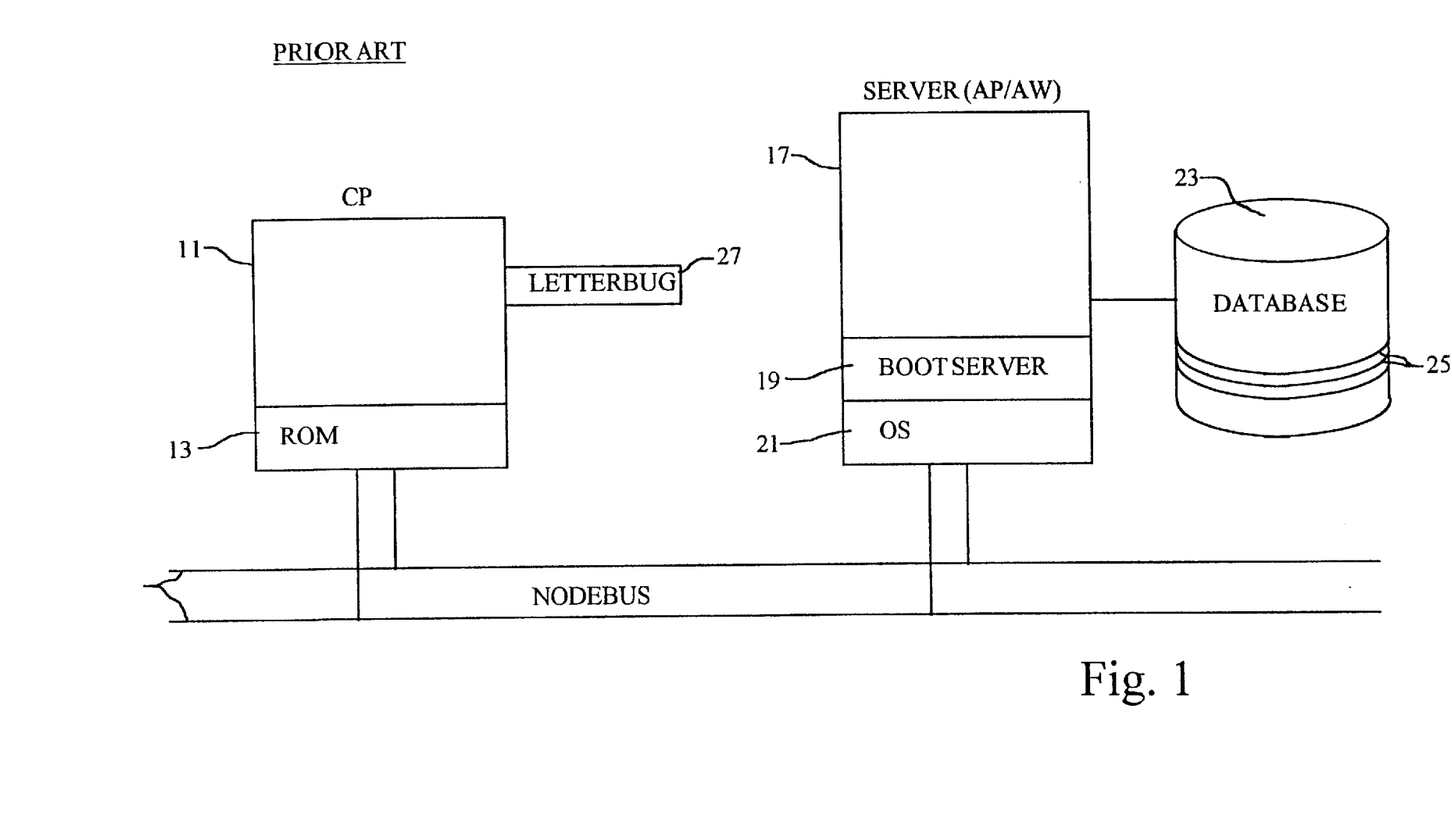
FIG. 1 depicts elements of a prior art distributed computing system.

The components of an example I/A Series system are depicted in FIG. 1. A server 17 provides database and control functions for the distributed processing system. Server 17 may be an I/A Series system model "AP" or "AW" server executing a "Solaris" Operating System ("OS") 21. A database 23 operates in connection with server 17. A "Nodebus" network 15 interconnects elements within the distributed processing system.

A Control Processor "CP" 11 is attached to Nodebus 15, and provides, e.g., process input/output ("I/O") functions. For example, CP 11 could include analog-to-digital converters for reading sensor data.

One operational issue in distributed processing systems is the distribution of software among the processors. In the I/A Series system of FIG. 1, server 17 includes a boot server 19 software component that is responsible for providing CP 11 with initial software, e.g., an operating system. Database 23 includes operating system images 25 for different CPs 11. In regard to initial software loading, CP 11 includes a bootstrap ROM 13 and a mechanically configurable identifier, i.e., a "letterbug" 27 for identification purposes. Letterbugs are more completely described in U.S. Pat. No. 5,006,842, entitled "Identity Insert Blocks for Electronic Modules", and issued on Apr. 9, 1991, which is hereby incorporated by reference herein in its entirety.

Figure 2:
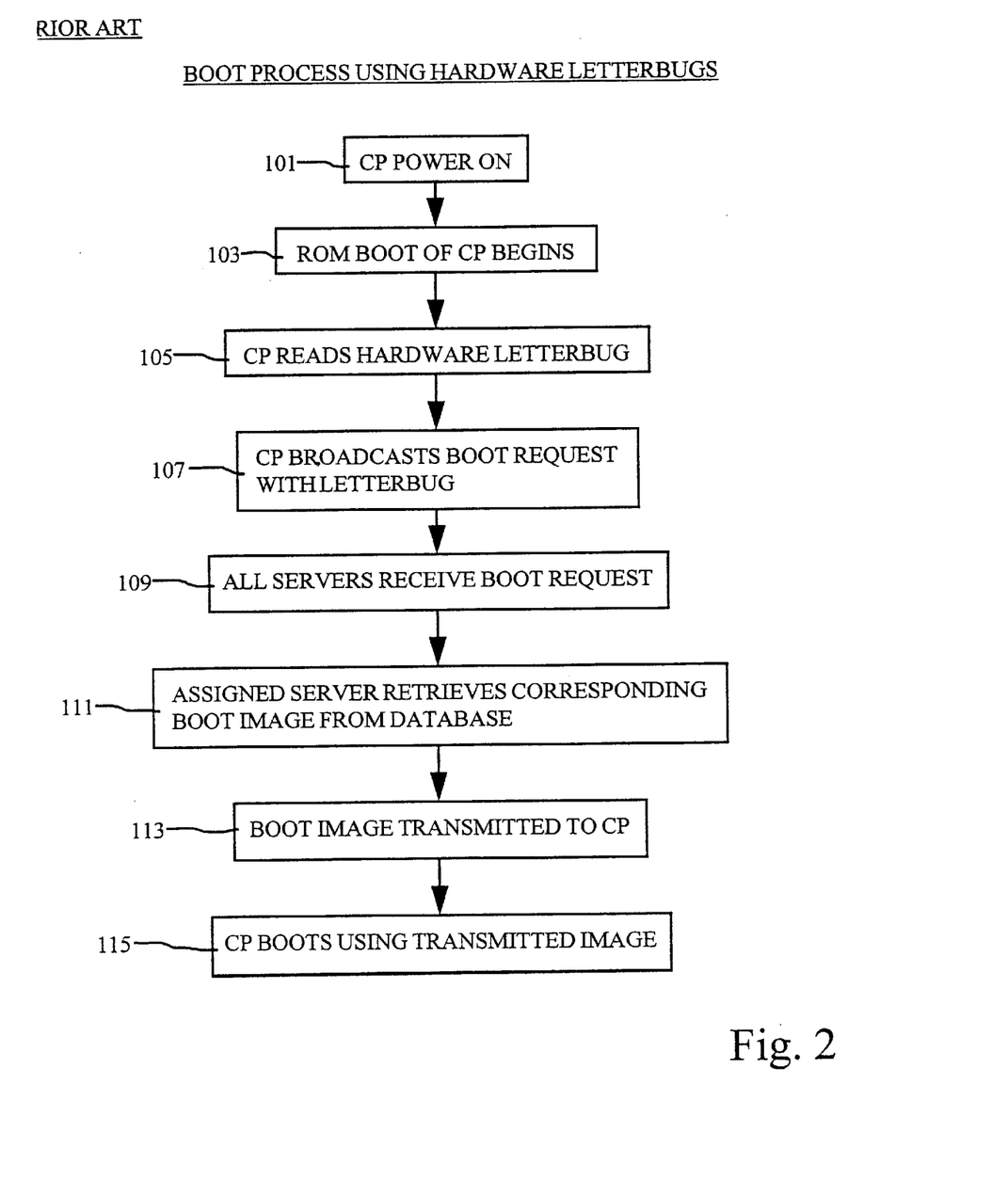
FIG. 2 is a flow diagram of a booting process used in the system of FIG. 1.

The boot process for CP 11 within the above described I/A Series system is described below with reference to the flow-diagram of FIG. 2. To begin, CP 11 is powered on or reset, STEP 101. A processor within CP 11 begins booting from a bootstrap loader within ROM 13, STEP 103. During execution of the bootstrap loader, the processor within CP 11 reads letterbug 27 such that the identity of CP 11 is established, STEP 105.

Once letterbug 27 has been read, CP 11 broadcasts a boot request containing letterbug 27 over Nodebus 15, STEP 107. Server 17, and all other servers on Nodebus 15, receive the boot request, STEP 109. A server (e.g., server 17) assigned to the particular letterbug 27 of CP 11 retrieves a corresponding boot image 25 from its database 23, STEP 111. The boot image is transmitted to CP 11, STEP 113, and CP 11 boots therefrom, STEP 115. As one example, in the "I/A Series" system, the boot image is that of a "VRTX" type embedded operating system, available from Microtec Research of Santa Clara, Calif., USA.

In some distributed computing systems it may be desirable to have processing nodes that lack mechanically configurable identifiers. Furthermore, these "identifierless" nodes may coexist in a system with nodes having mechanically configurable identifiers. This introduces difficulties with identification of the "identifierless" nodes, and difficulties in managing the boot image loading of such "identifierless" nodes through a common, system wide, boot image server.

The present invention is directed toward solutions to the above-noted problems.

DISCLOSURE OF THE INVENTION

In a first aspect, the present invention includes a method for use in booting a network attached computer. The method includes the computer transmitting a first load request over the network, wherein the first load request includes a generic identifier for the computer type. In response to the first load request, the computer receives a first program. The computer executes the first program which reads a first identifier associated with the computer. Then, based upon the first identifier, the computer obtains a second identifier (for example, a "soft letterbug") and transmits a second load request over the network. The second load request includes the second identifier, and is for an operating system for loading into the computer to facilitate its booting.

As enhancements, the first program may include at least a limited functionality version of the operating system. Further, the reading of the first identifier may include reading a serial number programmed into the computer, while executing the first program may include reading current hardware configuration information for the computer. Also, obtaining the second identifier may include transmitting the current hardware configuration information with the first identifier over the network to, for example, a server. The server may insure that the current hardware configuration is compatible with a previously stored hardware configuration for the computer.

In a second aspect, the present invention includes another method for use in booting a computer. The method includes the computer transmitting a first identifier associated with the computer over a network. The computer then receives a second identifier (e.g., a "soft letterbug") associated with the first identifier. A boot image request is then transferred over the network to facilitate the receipt of a boot image for the computer. In particular, the boot image request includes the second identifier such that the later received boot image corresponds to the computer.

As enhancements, the first identifier may comprise a serial number of the computer. Further, the second identifier may resemble a mechanically settable hardware identifier (e.g., a letterbug) of a different type of computer.

In another aspect, the present invention comprises a distributed computer system that includes a first computer, a second computer and a database. The first computer and second computer are communicably coupled through a network, while the database is coupled to the first computer.

The database has at least one operating system and at least one limited functionality version of the operating system stored on it. The limited functionality version of the operating system and the operating system facilitate booting of the second computer when sequentially transferred thereto.

As enhancements, the first computer may be a server and the second computer may be a field mountable industrial controller. The field mountable industrial controller may include a generic identifier stored in a non-volatile memory. Accordingly, the limited functionality version of the operating system is associated with the generic identifier in the database to facilitate transmission of the limited functionality version of the operating system to the field mountable controller.

BRIEF DESCRIPTION OF THE DRAWINGS

The subject matter regarded as the present invention is particularly pointed out and distinctly claimed in the concluding portion of the specification. The invention, however, both as to organization and method of practice, together with further objects and advantages thereof, may best be understood by reference to the following detailed description taken in conjunction with the accompanying drawings in which:

DETAILED DESCRIPTION OF A PREFERRED EMBODIMENT

The present invention facilitates the booting of a computer in a distributed computing system. In particular, the techniques disclosed herein facilitate the integration of a computer which does not have a mechanically configurable identifier into a distributed computing system wherein other computer may have such mechanically configurable identifiers.

Even more specifically, in the existing "I/A Series" system, from "The Foxboro Company", network attached computers (e.g., CPs) each have Letterbugs thereon. These Letterbugs identify the CP to a boot server 19 software module residing in a server. Boot server 19 sends appropriate operating system images to the CPs for booting based upon their letterbugs.

However, new computers within the "I/A Series" system (e.g., the "Micro I/A" controller, referred to herein as the Open Modular Controller ("OMC"), and described further in the pending U.S. Patent Application entitled "Distributed Control System, Including a Compact Easily Extensible and Serviceable Field Controller", Ser. No. 08/560,167, Filed on Nov. 20, 1995 which is hereby incorporated by reference herein in its entirety) are software configurable and do not have mechanically configurable identifiers (e.g., letterbugs). The techniques disclosed herein permit OMCs to use the same boot server 19 as, e.g., CP modules, without the use of manually configured identifiers (e.g., Letterbugs). These techniques are further applicable in other distributed processing systems which load boot images to network attached computers.

Figure 3:
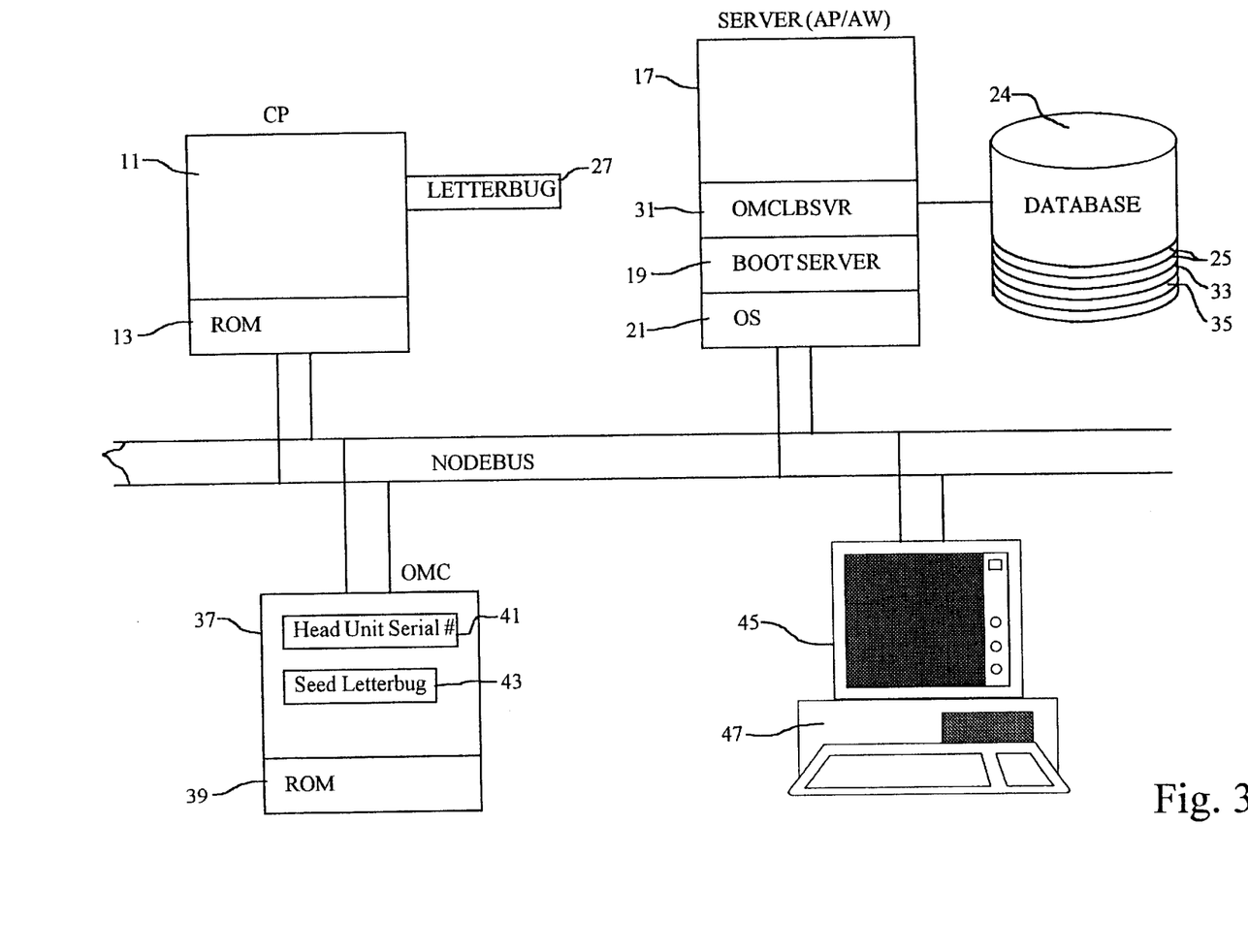
FIG. 3 depicts elements of a distributed computing system having nodes with and without mechanically configurable identifiers according to one embodiment of the present invention.

Turning to FIG. 3, a system configured in accordance with the techniques disclosed herein is depicted. An OMC 37 contains (in a non-volatile memory) a "head unit serial number" 41 and a "seed letterbug" 43 that are used during the boot process. Also, OMC 37 includes a bootstrap ROM 39 (or other non-volatile memory).

A user computer 47 having a graphical user interface ("GUI") 45 is used to interact with users of the computer system. To note, in some system configurations, GUI 45 could be integrated into server 17 if system resources and application requirements permitted.

In regard to server 17, an Open Modular Controller Letterbug Server ("OMCLBSVR") task 31 has been added thereto. OMCLBSVR 31 manages the distribution of "soft" Letterbugs to OMCs and will be discussed in further detail below. A database 24 differs from database 23 (FIG. 1) in that new operating system images 33 and 35 have been added to it. Operating system image 33 is a reduced functionality operation system for initially loading into OMC 37 during the boot process. Operating system image 35 is a full functionality operation system for loading into OMC 37 later in the boot process. To note, operating system 33 may be a reduced functionality version of operating system 35, or they may be identical, with operating system 33 utilizing a limited set of operating system resources through use of an initial program that is stored and transmitted therewith.

Figure 4:
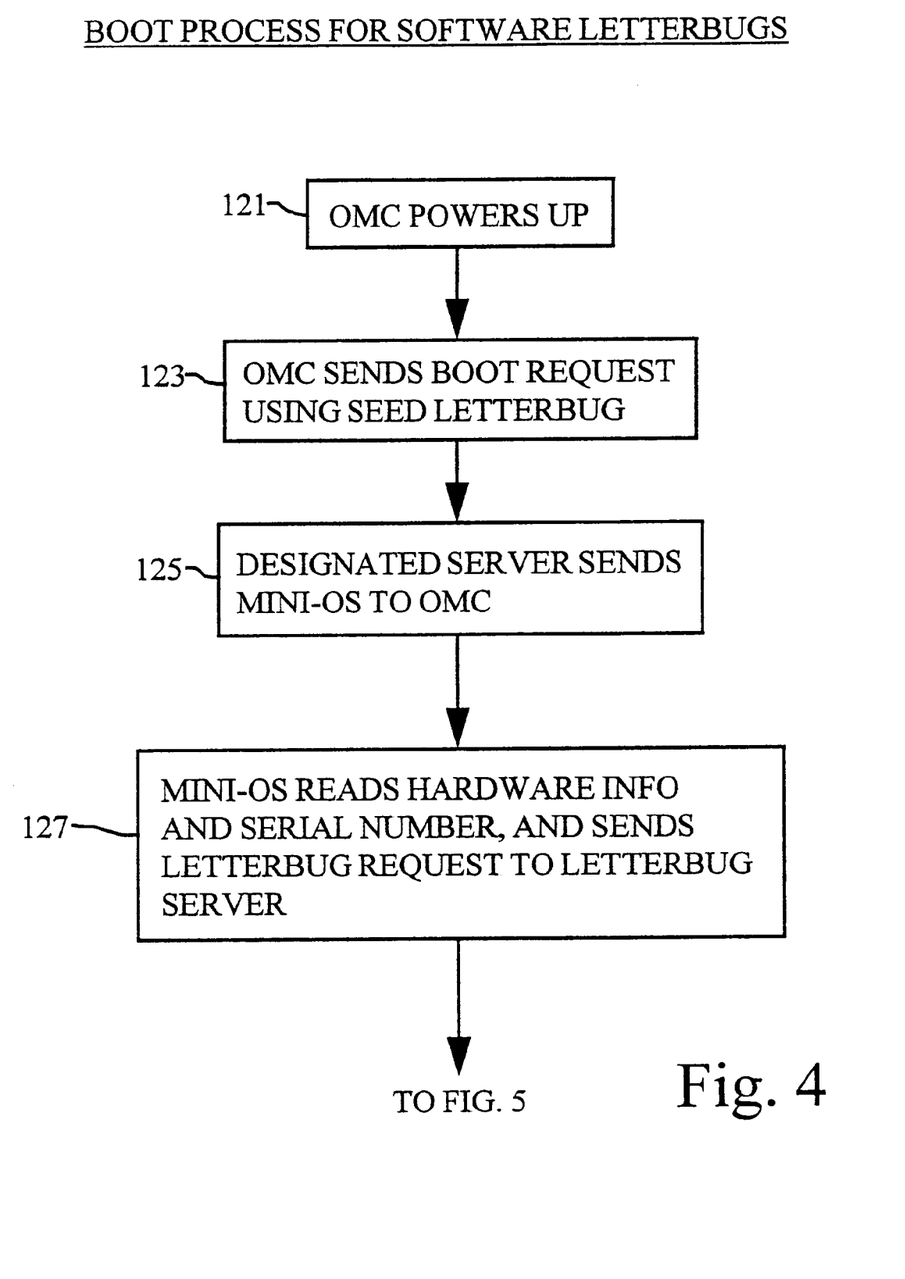
FIGS. 4–6 are flow-diagrams of a booting process used in the system of FIG. 3 pursuant to an embodiment of the present invention.
Figure 5:
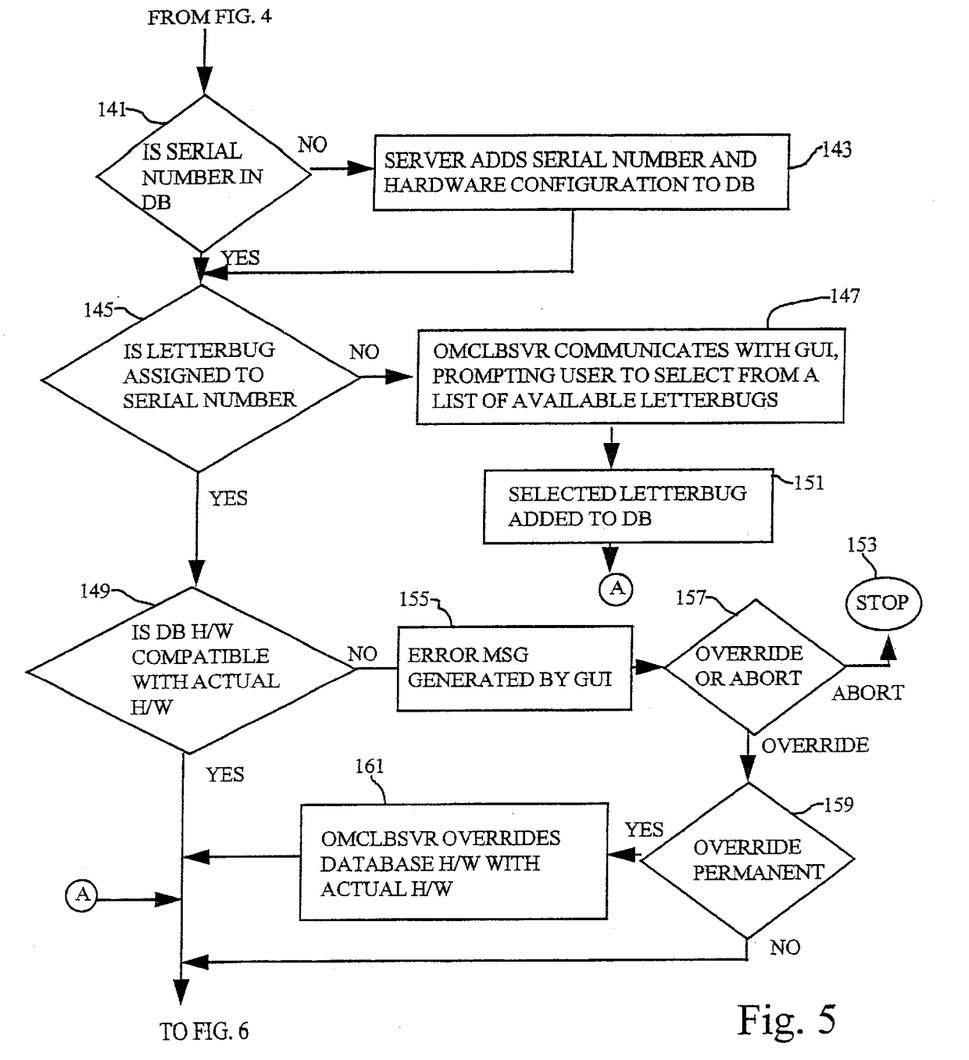
Figure 6:
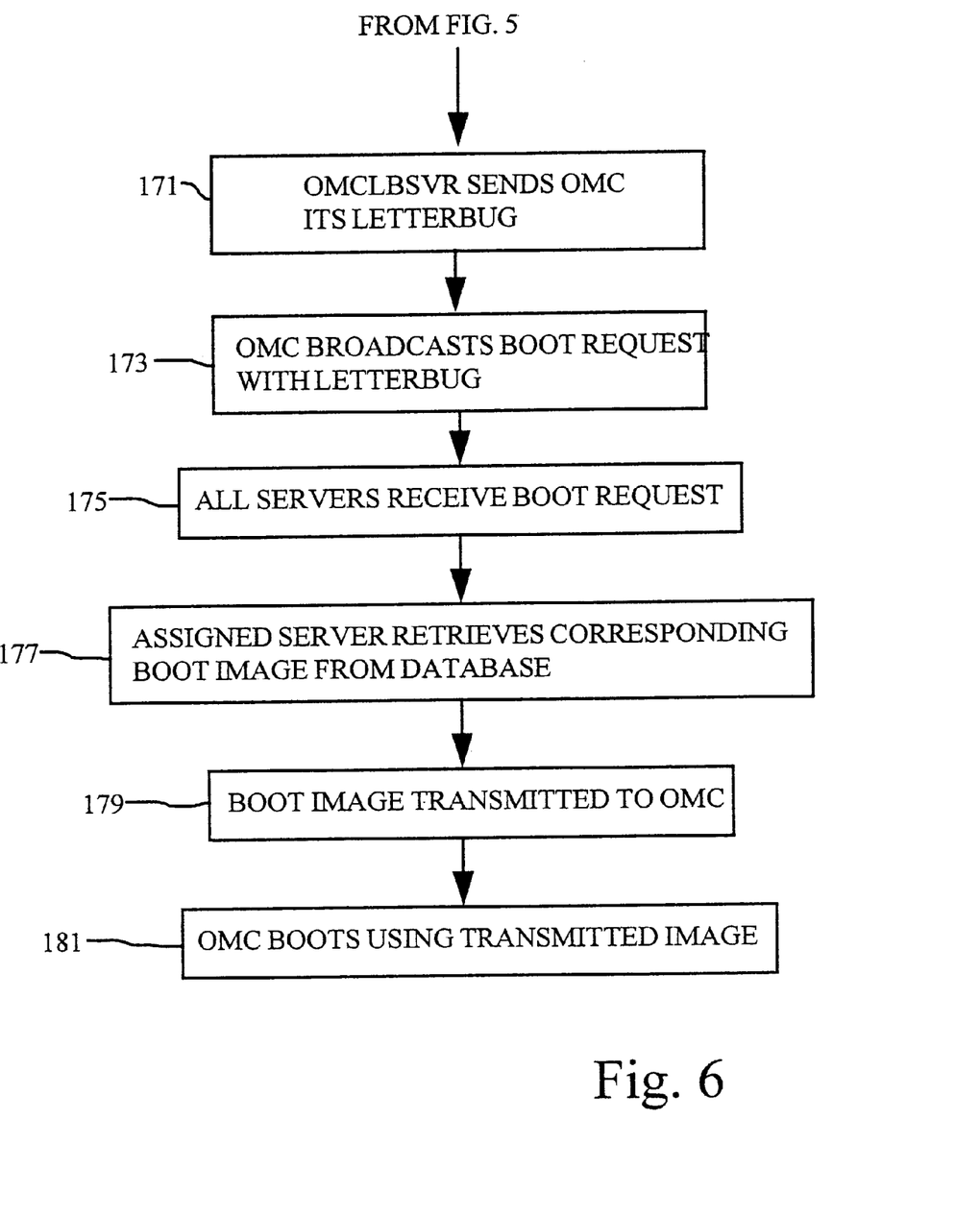

The boot process for OMC 37 is discussed in detail below with respect to the flow-diagrams of FIGS. 4–6 and the elements of the system of FIG. 3. To begin, OMC 37 is powered-up or reset such that booting thereof begins, STEP 121. OMC 37 reads a bootstrap loader program from ROM 39 and begin executing it. The bootstrap program reads seed letterbug 43 and broadcasts a boot request therewith onto network 15, STEP 123. This boot request is of the same type that CPs 11 use to boot (serviced by boot server 19 within server 17). However, according to the present invention, instead of transmitting a conventional particularized letterbug, seed letterbug 43 is transmitted. Seed letterbug 43 is a common letterbug to all OMCs using a common processor type (e.g., all OMC compatible with an "Intel" x86 instruction set). As one example, Seed Letterbug 43 is "FCBOOT".

Boot server 19 responds to the boot request using Seed Letterbug 43 by transmitting limited functionality operating system 33 to the requester, i.e., OMC 37, STEP 125 (or, again, a full operating system, with a limited set of resources utilized). Limited functionality operating system 33 executes a predefined program transmitted with it from boot server 19. This program reads information relevant to the boot process from OMC 37. More specifically, head unit serial number 41 and hardware information from OMC 37 are read and sent to OMCLBSVR 31 as part of a letterbug request, STEP 127. The hardware information may include, e.g., memory capacity, I/O cards installed, processor speed, firmware versions, etc.

OMCLBSVR 31 receives the letterbug request from OMC 37 and checks if head unit serial number 41 is stored within a database it maintains, INQUIRY 141. If the serial number is not within the database (e.g., a new OMC is added to the system), head unit serial number 41 and the hardware information for OMC 37 are added to the database, STEP 143.

To continue, a test is performed to see if the database entry for head unit serial number 41 has a letterbug associated with it, INQUIRY 145. If no letterbug has been assigned (e.g., a new OMC was added to the system and head unit serial number 41 was just added to the database), OMCLBSVR 31 sends a message to appropriate tasks coupled to GUI 45 that prompt a user to assign a letterbug to OMC 37, STEP 147. This letterbug may be selected from a predefined list of available letterbugs. The letterbug format is similar to that of the hardware letterbugs 27 for, e.g., CP 11. After selection, the letterbug is added to the database in association with head unit serial number 41 and transmitted hardware configuration, STEP 151, and processing continues at STEP 171, described below.

If a letterbug was already associated with head unit serial number 41 within database 24, a next test is performed to determine if the current hardware configuration of OMC 37 is compatible with the hardware configuration stored in association therewith in database 24, INQUIRY 149. In summary, the hardware is compatible if it is within the "equivalence set" (explained below) of hardware configurations which will operate properly with the predesignated operating system image for OMC 37.

If the current hardware configuration is not compatible with the previously stored hardware configuration, an error message is generated, STEP 155. In particular, OMCLBSVR 31 sends a message to GUI 45 which displays the error message to a user. The user is given the option of aborting the boot process in view of the error, or continuing despite the error, INQUIRY 157. If the user aborts to boot process, the boot process halts for OMC 37, STEP 153.

If the user chooses to continue with the boot process, despite the changed hardware configuration, the user chooses an override option, INQUIRY 157. Thereafter, the user is prompted to select either a permanent or temporary override, INQUIRY 159. If the user selects a temporary override, the boot process continues at STEP 171. If the user selects a permanent override, then OMCLBSVR replaces the stored hardware configuration for OMC 37 with the current OMC hardware configuration, STEP 161.

At this point in the boot process, OMCLBSVR 31 sends OMC 37 a letterbug, STEP 171. The letterbug is identical in format to the manually configured letterbugs of the type previously discussed in regard to, e.g., letterbug 27 of CP 11.

Therefore, OMC 37 may now boot using boot server 19 and the same boot mechanism as, e.g., CP 11. Accordingly, OMC 37 broadcasts a boot request containing its received letterbug over Nodebus 15, STEP 173. Server 17, and all other servers on Nodebus 15, receive the boot request, STEP 175. A server (e.g., server 17) assigned to the received letterbug retrieves a corresponding boot image 35 from its database 24, STEP 177. The boot image is transmitted to OMC 37, STEP 179, and OMC 37 boots therefrom, STEP 181, thereby completing the boot process according to an embodiment of the present invention.

Data Structures

In further explanation of the above-described process, below are examples of data structures used in connection with the present invention.

As a first example, an "omcdb" file is a UNIX-style ASCII file which contains the letterbug and configuration information about every OMC which has a complete database entry associated with it. The format of this file is given by the following Backus-Naur Form grammar:

```
file→omc_record_list
omc_record_list→ omc_record omc_record_list|
                 nil
omc_record→[attribute_value_pair_list]
attribute_value_pair_list→ attribute_value_pair attribute_value_pair_list|
                           nil
attribute_value_pair→(attribute_name,value)
attribute_name→text_string
value→text_string|
       attribute_value_pair attribute_value_pair_list
text_string→any ASCII text string enclosed in double quotes("").
```

Each complete letterbug record will contain at least the following fields:
 letterbug
 processor card part number
 processor card revision code
 head unit part number
 head unit revision code
 head unit serial number
 Ethernet card part number
 Ethernet card revision code
 BIOS version clock speed
 BIOS version part number
 BIOS version revision code Accordingly, the following is an example of a valid letterbug record:

```
[("letterbug","I200FC")("processor card",("part number","00000000")
("revision code","1.00"))("head unit",("part number","0P0940BW")
("revision code","B")("serial number","P9040EBB0012"))
("ethernet card",("part number","AAAAA")("revision code","BB"))
("BIOS version",("clock speed","66")("part number","CCCCCCCC")
("revision code","DDDD"))]
```

A further file, "equivsets" is a UNIX style ASCII file that contains equivalence sets for OMC hardware. These equivalence sets are used in determining if a current hardware configuration is equivalent to a previously stored hardware configuration. The format of this file is given by the following BNF:

```
file→equiv_set_list
equiv_set_list→ equiv_set equiv_set_list|
                nil
equiv_set→[attribute_specification_list]
attribute_specification_list→ attribute_specification attribute_specification_list|
                              nil
attribute_specification→(attribute_name values_list)
values_list→ value values_list|
             nil
value→ "any text string"|
       "!any text string"|
       "*"
attribute_name→any text string accepted by the regular expression:
"alnum+(:alnum+)+"where alnum is
               any alphanumeric character.
```

The "equivsets" file has provisions for comments. Whenever a pound sign ('#') appears in the equivsets the parser will ignore all text from the # to the end of the line.

The following is an example of an "equivsets" file (lines beginning with a pound sign ('#') are comments:

```
##############################################################

#FUNCTION: This file contains lists of compatible OMC configurations.

##############################################################
#The image(s) which contains support for all ethernet cards except type 23
#will work with BIOS versions 6A and 7A. If the initial and actual configurations
#contained any ethernet card except 23 and used BIOS version 6A or 7A, the image
#initially associated with that OMC's letterbug will work with the actual configuration.
#Images that work with the BIOS version/ethernet card types specified here will work
#with any combination of other OMC attributes. For example, any type of head unit will
#work with these configurations.
#The hardware configurations specified in this entry work with image OMCOS1
[("ethernet card:revision code""*""!23")("BIOS version:revision code""6A""7A")]
#ethernet card type 23 needs BIOS version 8B and a special head unit(type 88)
#The hardware configurations specified in this entry work with image OMCOS2
[("ethernet card:revision code""23")("BIOS version:revision code""8B")
("head unit:revision code""88")]
#All other types of BIOS versions require head unit type 99 and will work with any
#ethernet card
#The hardware configurations specified in this entry work with image OMCOS3
[("BIOS version:revision code""*""!6A""!7A""!8B")("head unit:revision code""99")]
```

The above example specifies the sets of hardware configurations which work with each of three possible OMC images. If an attribute is not mentioned in a set (for instance, "head unit:part number" is not mentioned in any of the equivalent sets) then OMCLBSVR 31 will assume that any value is allowed. An asterisk ("*") for a value also specifies that any value is allowed for that attribute. If an exclamation mark ("!") appears before a value it means that that value is specifically excluded from the list of possible values for an attribute.

It is syntactically possible to specify that a particular hardware configuration be in more than one equivalent set, or to specify an empty equivalent set for which all configurations are a member. OMCLBSVR 31 will do limited checking for this sort of error condition.

GUI Operation

Figure 7:
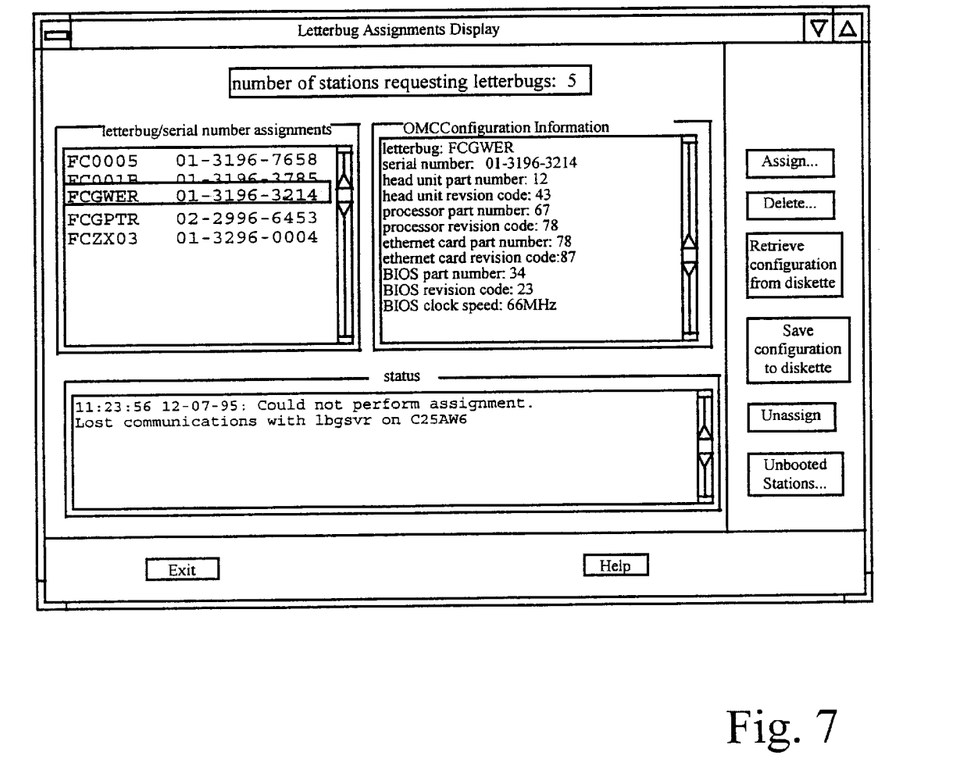
FIGS. 7–10 are dialog boxes presented to a user according to one embodiment of the present invention.

The operation of GUI 45 (managed by an LBMAP task) is described below in connection with the screen displays of FIGS. 7–10. Depicted in FIG. 7 is the main OMC letterbug assignments window. The display consists of four windows and eight buttons. The function of each is described below:

"number of unbooted stations" window—This window contains a count of the number of OMCs that are currently trying to boot but have not be issued letterbugs. If the count in this window is non-zero the "Unbooted Stations" . . . button will be selectable.

"letterbug/serial number" assignments window—This window contains a list of the letterbug/serial number pairs that have been assigned.

"OMC Configuration" window—This window contains configuration information for the currently selected OMC.

"Status" window—The status window contains text messages describing LBMAP/OMCLBSVR activity. It logs all communication problems, letterbug assignments and unassignments, OMC boot problems, and station creations/deletions that occur. The status window will contain information on the last, e.g., 1000 actions that have occurred since LBMAP started.

Figure 8:
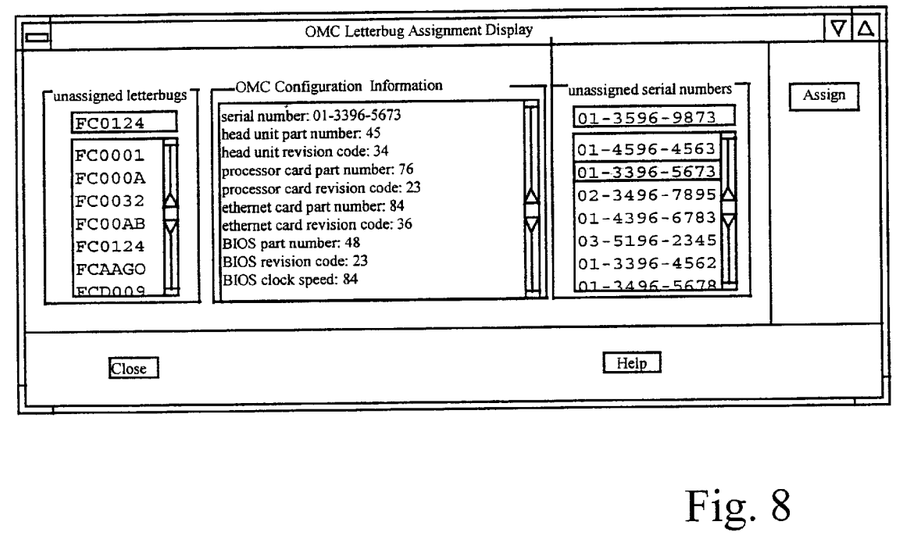

"Unassign" button—The Unassign button breaks the association between the letterbug and serial number in the currently selected "letterbug/serial number" assignments window item. The "Unassign" button will not be selectable if nothing is selected in the "letterbug/serial number" assignments window. If the unassignment was successful the letterbug/serial number pair will be removed from the "letterbug/serial number" assignment window, leaving nothing selected. The unassigned letterbug will be added to the "unassigned letterbugs" window (FIG. 8) and the serial number will be added to the "unassigned serial numbers" window (FIG. 8). If the unassignment was not successful, then no change will be affected on the display and a dialog box will appear stating the reason the unassignment could not be completed. The reasons an unassignment may not be completed are:

OMCLBSVR not responding—The assignment message could not be sent to the OMCLBSVR task.

LBMAP database out-of-date—OMCLBSVR lost communication with LBMAP at some point in the past and LBMAP's database is out-of-date. In such an event, LBMAP will automatically receive a fresh copy of the database.

Badly formatted message—LBMAP sent OMCLBSVR a badly formatted message.

"Assign . . . " button—The "Assign . . . " button brings up the "OMC Letterbug Assignment Display" dialog box (FIG. 8). This button is not selectable if the "OMC Letterbug Assignment Display" dialog box is already active.

Figure 9:
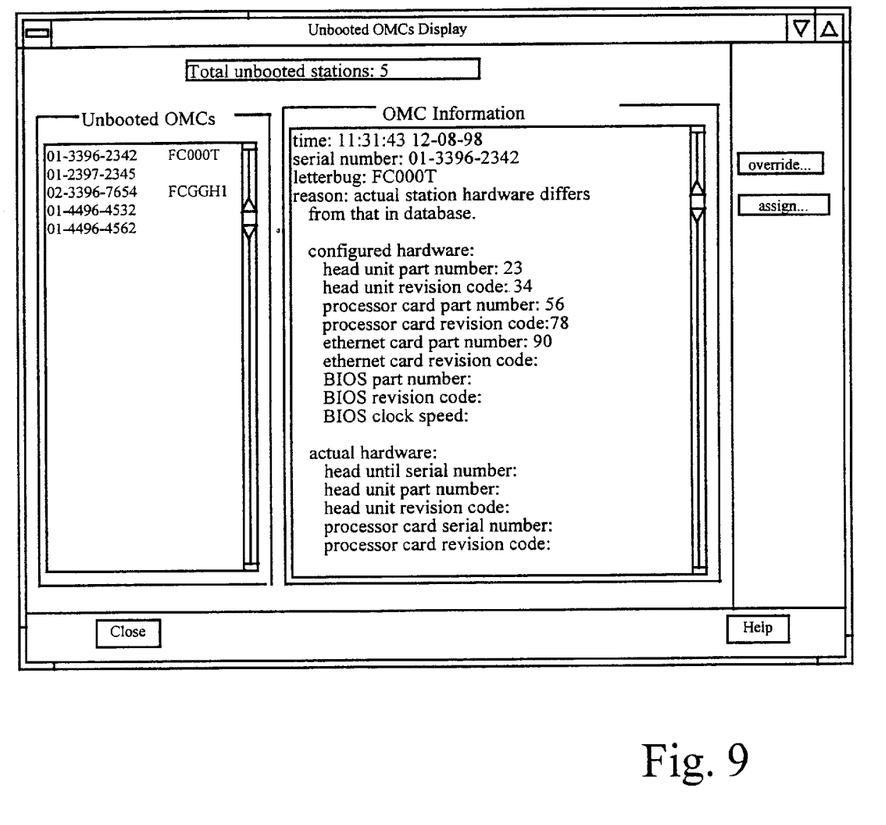

"Unbooted Stations . . . " button—The "Unbooted Stations . . . " button brings up the "Unbooted OMCs Display" dialog box (FIG. 9). This button is not selectable if the "Unbooted OMCs Display" dialog box is already active.

Figure 10:
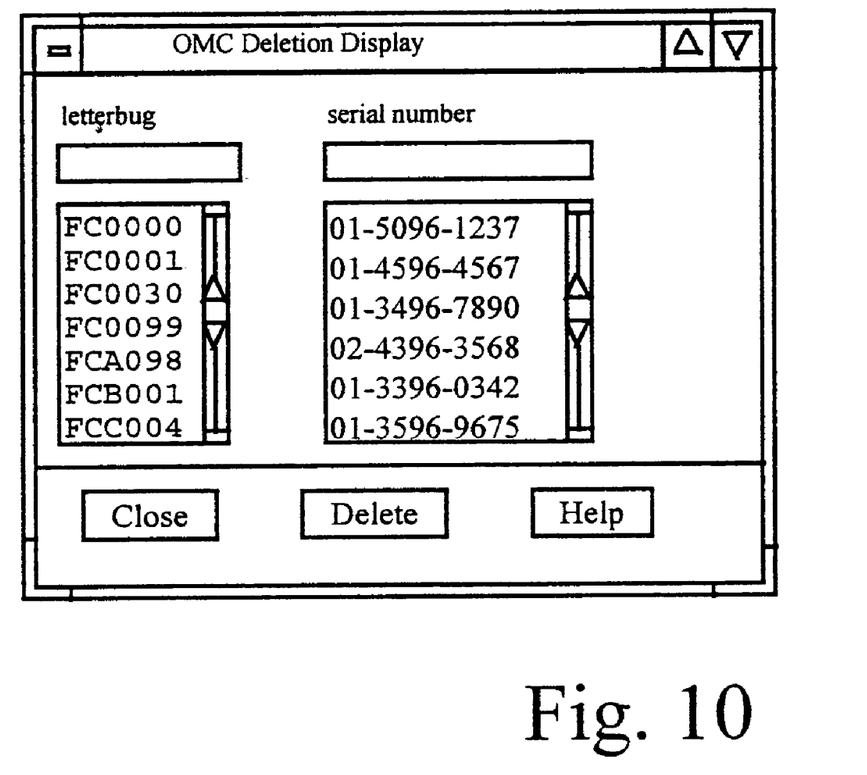

"Delete . . . " button—The "Delete . . . " button brings up the "OMC Deletion Display" dialog box (FIG. 10). This button is not selectable if the "OMC Deletion Display" dialog box is already active.

"Retrieve configuration from diskette" button—This button causes LBMAP to read in the letterbug assignment and serial number information from, e.g., a tar-formatted floppy diskette and to send it to OMCLBSVR 31 that will save it.

"Save configuration to diskette" button—The "Save configuration to diskette" button causes LBMAP to retrieve a fresh version of the database from OMCLBSVR 31 and save "omcdb" on, e.g., a tar-formatted floppy diskette on LBMAP's local floppy drive.

"Exit" button—The "Exit" button causes LBMAP to exit.

"Help" button—The "Help" button displays the on-line documentation for the letterbug assignments window.

Depicted in FIG. 8 is the "OMC Letterbug Assignment Display" which is a modeless dialog box from which the user can assign letterbugs to OMCs. The dialog box contains three windows and three buttons, the functions of which are described below:

"Unassigned letterbugs" window—This window contains an alphabetically sorted list of OMC letterbugs which have not been assigned serial numbers or have had their assignments broken. One letterbug is selectable at a time.

"Unassigned serial numbers" window—This window contains a numerically sorted list of OMC serial numbers which have not been assigned letterbugs or have had their assignments broken. One serial number is selectable at a time.

"OMC Configuration Information" window—This window contains configuration information about the OMC whose serial number is currently selected in the "unassigned serial numbers" window.

"Assign" button—The "Assign" button assigns the letterbug selected from the "unassigned letterbugs" window to the serial number selected from the "unassigned serial numbers" window. When the user presses the "Assign" button, LBMAP will perform the assignment. If the assignment is successful, the selected letterbug will be removed from the "unassigned letterbugs" window, the selected serial number will be removed from the "unassigned serial numbers" window and the "OMC Configuration Information" window will be blanked out. No letterbug or serial number will be selected if the assignment is successful and the letterbug/serial number pair will appear in the main window's "letterbug/serial number" mapping sub-window. If the assignment was not successful then no change will be affected on the display. A dialog box will appear stating the reason that the assignment could not be completed. The reasons an assignment could not be completed are:

OMCLBSVR not responding—The assignment message could not be sent to the OMCLBSVR.

LBMAP database out-of-date—OMCLBSVR lost communication with LBMAP at some point in the past and LBMAP's database is out-of-date. In this case, LBMAP automatically receive a fresh copy of the database.

Badly formatted message—LBMAP sent OMCLBSVR a badly formatted message.

"Help" button—The Help button displays the on-line documentation available for the "OMC Letterbug Assignment Display" dialog box.

"Close" button—The "Close" button dismisses the "OMC Letterbug Assignment Display" dialog box.

Depicted in FIG. 9 is the "Unbooted OMCs Display" dialog box. This is a modeless dialog box that contains information about all of the OMCs in the system which are currently trying to boot but can not be assigned letterbugs. When LBMAP is started, this dialog box will automatically become active if there are any OMCs which can not be issued letterbugs. This dialog contains three windows and four buttons, the functions of which are described below:

"Total unbooted stations" window—This window contains a count of the number of OMCs which have requested letterbugs but can not receive them.

"Unbooted OMCs" window—This window contains a list of all OMCs which are trying to boot but can not be issued letterbugs. The head unit serial number of each unbooted station is listed. If the OMC is also assigned a letterbug, its letterbug is listed alongside its serial number. Selecting an item in this list causes the "OMC Information" window to display the reason the selected station could not be issued a letterbug.

"OMC Information"—This window contains information about the OMC selected in the "Unbooted OMCs" window. The information in this window has the following fields:

"time"—The time the unbooted OMC requested a letterbug.

"serial number" The serial number of the unbooted OMC.

"letterbug field"—Letterbug of unbooted OMC if a letterbug has been assigned but it can't boot.

"reason" A message describing the reason the OMC can not be assigned a letterbug. The possible reasons a OMC could not be issued a letterbug are:

The OMC was never assigned a letterbug.

The OMC's configuration information does not match the information in the database.

"Override . . . " button—This button is selectable if the selected unbooted OMC is unbooted because its configuration differs from the one stored in the database. Pressing this button will cause OMCLBSVR to issue the unbooted OMC its letterbug despite its actual hardware not matching that which was previously configured. When the user presses the "override" button he will be presented with a dialog box that asks him weather he wants to temporarily or permanently override the initial configuration. If the user chooses to temporarily override the configuration then OMCLBSVR will not modify the OMC's configuration in "omcdb". If the user chooses to permanently override the configuration then omcdb will be modified to reflect the current OMC's hardware.

"Assign . . . " button—This button is selectable if the selected unbooted OMC is unbootable because its serial number has not been assigned a letterbug.

Pressing this button brings up the "OMC Letterbug Assignment Display" dialog box (FIG. 8).

"Help" button—The "Help" button displays the on-line documentation available for the "Unbooted OMCs" dialog box.

"Close" button—The "Close" button dismisses the Unbooted OMCs dialog box.

Depicted in FIG. 10 is the "OMC Deletion Display" dialog box. This is a modeless dialog box that allows the user to select an OMC, either by letterbug or by serial number. This dialog contains two windows and three buttons, the functions of which are described below:

"Letterbug" window—If the user selects a letterbug from the "letterbug" list (a list of all letterbugs which have been assigned to OMCs) then the corresponding serial number will appear in the "serial number" selection box.

"Serial number" window—If the user selects a serial number, the corresponding letterbug will appear in the "letterbug" selection box.

"Delete" button—Pressing the "Delete" button removes the selected serial number from the file "omcdb".

"Close" button—The "Close" button removes the deletion dialog box without deleting the selected serial number.

"Help" button—The "Help" button displays help information for the "OMC Deletion Display" dialog box.

To summarize, the present invention has many advantages and features associated with it. Processing nodes without manually configurable identifiers are integrated into a distributed processing system originally designed for processing nodes having manually configurable identifiers. Specifically, booting of the new processing nodes is facilitated through a software driven process by which "letterbugs" are assigned to the new processing nodes during an early booting phase such that in a later booting phase, these "letterbugs" are used with the boot image server of the distributed processing system.

Described above are examples of techniques for booting a network attached processor in a distributed processing system. It will be apparent to those of ordinary skill in the art that the above-described flows and sequences of steps are only examples. There can be many variations to the above, including, for instance, processing more or less than the steps described above, modifying one or more of the steps, or changing the order of some steps without departing from the true spirit and scope of the present invention. These variations are, therefore, considered a part of the claimed invention.

While the invention has been described in detail herein, in accordance with certain preferred embodiments thereof, many modifications and changes thereto may be affected by those skilled in the art. Accordingly, it is intended by the appended claims to cover all such modifications and changes as fall within the true spirit and scope of the invention.

We claim:

1. A method for use in booting a network attached computer, said method comprising:
   (a) said computer transmitting a first load request over said network, said first load request including a generic identifier for a type of said computer;
   (b) receiving, into said computer, a first program in response to said first load request;
   (c) executing said first program, said executing including said first program reading a first identifier associated with said computer; and
   (d) based upon said first identifier, said computer obtaining a second identifier and transmitting a second load request over said network, said second load request including said second identifier, said second load request being for an operating system for loading into said computer to facilitate said booting thereof.

2. The method of claim 1, wherein said first program includes at least a limited functionality version of said operating system.

3. The method of claim 1, wherein said reading said first identifier comprises reading a serial number programmed into said computer.

4. The method of claim 1, wherein said executing (c) includes said first program reading current hardware configuration information for said computer.

5. The method of claim 4, wherein said obtaining (d) includes transmitting said current hardware configuration information with said first identifier over said network.

6. The method of claim 5, wherein a server is coupled to said network, and wherein said method further comprises said server receiving said current hardware configuration information and comparing said current hardware configuration information to previously stored hardware configuration information for said computer.

7. The method of claim 6, wherein said server transmits said second identifier to said computer if said current hardware configuration information is compatible with said previously stored hardware configuration information.

8. The method of claim 6, wherein a message is generated if said current hardware configuration information is incompatible with said previously stored hardware configuration information.

9. The method of claim 8, further comprising, if said current hardware configuration information is incompatible with said previously stored hardware configuration information, prompting a user to select at least one of aborting said booting of said computer and continuing said booting of said computer.

10. The method of claim 9, wherein if the user selects aborting said booting, said method further comprises aborting said booting of said computer.

11. The method of claim 9, wherein if said user selects to continue said booting, said method includes prompting said user to select at least one of permanently overriding and temporarily overriding said previously stored hardware configuration information.

12. The method of claim 11, wherein if said user select said permanently overriding, said previously stored hardware configuration information in said database is overwritten with said current hardware configuration information.

13. The method of claim 1, wherein said obtaining (b) includes said computer transmitting, and a server receiving, said first identifier and said server searching a database for said first identifier.

14. The method of claim 13, wherein if said first identifier is found, said method includes said server checking said database for information associated with said first identifier.

15. The method of claim 14, wherein if said first identifier is found, said method includes said server checking said database for any second identifier associated with said first identifier.

16. The method of claim 15, wherein if said any second identifier is not found, said method includes prompting said user to select said second identifier for said computer.

17. The method of claim 16, further comprising, after said user selecting said second identifier, transmitting said second identifier to said computer.

18. The method of claim 15, wherein, if said second identifier is found, said method includes transmitting said second identifier to said computer.

19. The method of claim 1, further comprising a network connected server responding to said second load request by transmitting an operating system to said computer, said operating system being retrieved from a database in association with said second identifier.

20. The method of claim 19, wherein said second identifier comprises a letterbug.

21. A method for use in booting a computer comprising:
(a) said computer transmitting a first identifier associated with said computer over a network;
(b) receiving, into said computer, a second identifier associated with said first identifier; and
(c) transmitting a boot image request over said network to facilitate the receipt of a boot image for said computer, said boot image request including said second identifier, said boot image corresponding to said second identifier.

22. The method of claim 21, wherein said first identifier comprises a serial number of said computer.

23. The method of claim 21, wherein said second identifier resembles a mechanically settable hardware identifier of a different type of computer.

24. The method of claim 23, wherein said second identifier comprises a software letterbug.

25. A distributed computer system comprising:
a first computer, said first computer being coupled to a network;
a second computer, said second computer being coupled to said network such that said second computer is communicably coupled to said first computer;
a database coupled to said first computer, said database having at least one operating system and at least one limited functionality version of said operating system stored thereon, wherein said limited functionality version of said operating system and said operating system facilitate booting of said second computer when sequentially transferred thereto;
a third computer, said third computer having a manually settable identifier thereon;
wherein said database includes an association between a field representing said manually settable identifier and a corresponding operating system of said at least one operating system within said database; and
wherein said field representing said manually settable identifier of said third computer and a software identifier of said second computer are stored in different records of a same field within said database.

26. The system of claim 25, wherein said first computer comprises a server.

27. The system of claim 25, wherein said second computer comprises a field mountable industrial controller.

28. The system of claim 25, wherein said second computer further comprises a generic identifier stored in a non-volatile memory, and wherein said limited functionality version of said operating system is associated with said generic identifier in said database to facilitate transmission of said limited functionality version of said operating system to said second computer.

29. The system of claim 25, wherein said same field comprises a letterbug field.

* * * * *